(12) United States Patent
Mattson et al.

(10) Patent No.: US 8,219,723 B2
(45) Date of Patent: *Jul. 10, 2012

(54) SYSTEMS AND METHODS FOR USING A SHARED BUFFER CONSTRUCT IN PERFORMANCE OF CONCURRENT DATA-DRIVEN TASKS

(75) Inventors: Peter Mattson, Sunnyvale, CA (US); David Goodwin, Los Altos, CA (US)

(73) Assignee: Calos Fund Limited Liability Company, Dover, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/275,581

(22) Filed: Oct. 18, 2011

(65) Prior Publication Data

US 2012/0036288 A1 Feb. 9, 2012

Related U.S. Application Data

(63) Continuation of application No. 12/331,357, filed on Dec. 9, 2008, now Pat. No. 8,041,852.

(51) Int. Cl.
*G06F 13/28* (2006.01)

(52) U.S. Cl. ............... 710/25; 710/22; 710/28; 718/107
(58) Field of Classification Search ........................ None
See application file for complete search history.

(56) References Cited

U.S. PATENT DOCUMENTS

| 6,161,169 | A | 12/2000 | Cheng |
| 6,658,525 | B1 | 12/2003 | Huang et al. |
| 7,246,202 | B2 | 7/2007 | Morishita et al. |
| 8,041,852 | B1 | 10/2011 | Mattson et al. |
| 2008/0120441 | A1 | 5/2008 | Loewenstein |

OTHER PUBLICATIONS

U.S. Appl. No. 12/331,357, filed Dec. 9, 2008.

*Primary Examiner* — Eron J Sorrell

(57) ABSTRACT

Disclosed herein are techniques to execute tasks with a computing device. A first task is initiated to perform an operation of the first task. A buffer construct that represents a region of memory accessible to the operation of the first task is created. A second task is initiated to perform of an operation of the second task that is configured to be timed to initiate in response to the buffer construct being communicated to the second task from the first task.

20 Claims, 4 Drawing Sheets

SYSTEMS AND METHODS FOR USING A SHARED BUFFER CONSTRUCT IN PERFORMANCE OF CONCURRENT DATA-DRIVEN TASKS

RELATED APPLICATION

This application is a continuation of U.S. patent application Ser. No. 12/331,357, now U.S. Pat. No. 8,041,852, filed on Dec. 9, 2008 and entitled "System and Method for Using a Shared Buffer Construct in Performance of Concurrent Data-Driven Tasks," which is hereby incorporated by reference in its entirety.

BACKGROUND INFORMATION

Conventional approaches to facilitate parallelism in systems that use multiple processing resources (such as dedicated processing elements) typically rely on a programmer to manually identify and map the threads and memory region locks that are to be performed. Such manual approaches are often error-prone and inefficient. As many parallel computing environments rely on direct memory access (DMA) operations, conventional systems have a high potential for creating conflicts among concurrent tasks and operations that access a common region of memory.

DETAILED DESCRIPTION OF EMBODIMENTS

Figure 1:
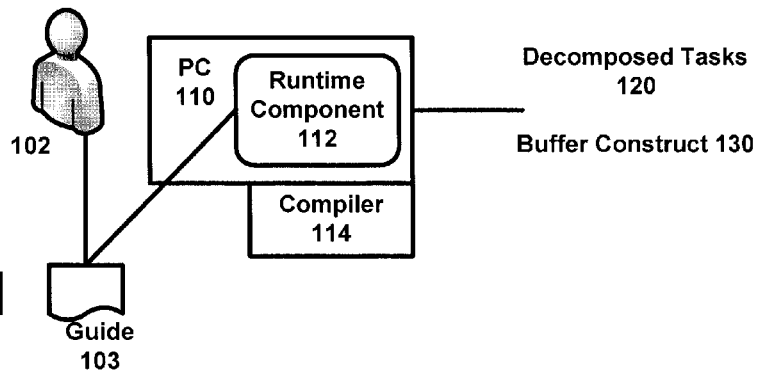
FIG. 1 illustrates a program developed to decompose tasks to be performed in parallel by using a buffer construct that represents a region of memory accessible by multiple tasks.

Embodiments described herein provide a computing environment that includes synchronized access and use of a common region of memory by multiple concurrent data-driven tasks. The tasks may be synchronized through the use of a buffer construct (e.g., a data structure) that represents the common region of memory. In particular, the tasks' direct memory access operations that access the region of memory represented by the data structure, may also be synchronized.

According to some embodiments, a computing environment, such as the computing environment described below, may be implemented in the context of one or more component or task-level processors, an external memory resource, and one or more secondary processors that are used by individual tasks of the task-level processor. In this context, embodiments described herein provide that the individual tasks are able to execute concurrently—utilizing parallelism provided in part by one or more secondary processors—without creating conflicts in their respective access and use of the external memory resource. Rather, each task is able to create a pipeline to transfer data between the external memory resource and a corresponding secondary processor without conflict of other pipelines or access operations initiated by other tasks. The use of the external memory resource by each task may be timed to avoid conflicts, as provided by embodiments described herein.

According to some embodiments, a buffer construct is provided in the form of a data structure that represents a region of memory. The region of memory may correspond to a portion of the external memory resource, which may be individually accessed by concurrent tasks. Accordingly, the buffer construct is controlled and used by one task at a time, but shared among by multiple tasks (sometimes repeatedly) over a duration in which the concurrent tasks are performed. At a given instance in which multiple concurrent tasks are executing, an individual task using the buffer construct also maintains exclusive access to the region of memory. Thus, each task may be enabled to control the buffer construct for its own use, and pass or otherwise communicate the buffer construct to another task when appropriate. Each task that controls the buffer construct may pass the buffer construct to the next task that desires access to the represented region of memory in response to completion of the pending memory access operations of the controlling task. In this way, the buffer construct provides a synchronization mechanism between multiple concurrent tasks that desire access to a represented region of memory.

Embodiments described herein also provide a computer system. According one embodiment, individual tasks perform direct memory access (DMA) operations. In this context, each task controls the buffer construct exclusively of all other tasks, so that the region of memory that is represented by the buffer construct is available to the controlling task without contention from other tasks. The controlling task may perform DMA load and store operations to the represented region of memory, and relinquish control of the buffer construct upon completion of pending DMA operations that were initiated. Another task that desires access to the region of memory then waits until the controlling task makes the buffer construct available. Thus, no other task can initiate DMA operations to the represented region of memory until the task that controls the buffer construct has completed its pending DMA operations. In this way, the buffer construct acts as a token that enables timing of DMA operations among tasks that use the same region of memory so that one task does not interfere with the DMA operations of another task.

Embodiments described herein recognize that programs constructed for parallel processing environments may inadvertently result in memory access operations that are conflicting. In particular, parallel processing environments often utilize DMA operations to perform load and store operations when using external memory and processing resources. In a computing environment where parallelism is used, the performance of DMA operations by one task may conflict with, for example, the performance of DMA operations that are to be performed under another task (that is to be concurrently performed). Accordingly, some embodiments provide for use of a buffer construct that serves as a token to both enable DMA operations to be performed by a task, and signal or trigger when the DMA operations are to be performed, by enabling one task to pass or enable use of the buffer construct by another task.

In another embodiment, multiple concurrent data-driven tasks may be performed concurrently in an architecture where the tasks are performed on processors that use external processing resources and external memory. In order to use the external memory and processing resources, the tasks control or initiate performance of DMA operations in order to load data from the external memory to the external processing resource and to store data outputted from the external processing resource to the memory.

As used herein, a "buffer construct" is a data item (such as a data structure) that has pointers or address information to identify portions of a specific region of memory. As described herein, some embodiments provide that a buffer construct includes state information that enables the buffer construct to be assigned exclusively to one task, so that only that task is able to access the region of memory while the buffer construct is assigned.

As used herein, the term "concurrent" or derivations thereof, as used in the context of "tasks" (or implementation of logic), means that two tasks overlap in durations of time that are defined by start and end times.

Some embodiments described herein provide for a computer system that is capable of performing multiple data-driven tasks. According to an embodiment, the system includes a first processor, a second processor that is external to the first processor, and a memory that is external to the first processor and the second processor. The first processor is configured to execute multiple tasks. In performing a first task, the first processor is configured to create a buffer construct for use in performing a set of operations of the first task that desires access to a region of memory. The first processor performs one or more operations of the first task to access the region of memory. These operations include loading data from the region of memory to the second processor and storing data outputted from the second processor in the region of memory. The first processor performs the one or more operations of the first task using the buffer construct. In particular, the buffer construct is assigned to the first task until at least all operations that are initiated with performance of the first task to store data from the second processor to the memory are complete, and made available for use by another of the plurality of tasks to access the region of memory. The performance of the second task is initiated to be concurrent with performance of the first task. The one or more operations of the second task to access the region of memory include loading data from the region of memory to the second processor and storing data outputted from the second processor in the region of memory. The one or more operations of the second task to access the region of memory are timed to initiate in response to the buffer construct being made available for use during performance of the first task.

Still further, in another embodiment, multiple data-driven tasks are concurrently performed. The multiple data-driven tasks including a first task and a second task that each control performance of one or more DMA operations to utilize an external processing resource using data stored on a first region of memory that is external to the external processing resource. While performing at least the first task, a buffer construct is created to perform the one or more DMA operations. The buffer construct represents the first region of memory, so that the first task accesses the first region of memory using the buffer construct. The one or more DMA operations controlled by the first task include assigning the buffer construct to only the first task when any of the one or more DMA operations to store data to the region of memory are in progress, so that no other task is able to use the buffer construct to access the region of memory while the buffer construct is assigned to the first task. In performing the one or more DMA operations controlled by the second task, the one or more DMA operations are initiated upon the buffer construct being released from being assigned to the first task. The buffer construct is assigned to the second task, so that no other task is able to use the buffer construct to access the region of memory when the buffer construct is assigned to the second task.

Still further, another embodiment provides a computer system for performing multiple data-driven tasks, wherein the system includes a first processor, and a memory that is external to the first processor. The first processor is configured to execute a plurality of concurrent tasks, including a first task and a second task, by performing one or more operations of the first task, creating a buffer construct that represents a region of memory as part of performing the first task, and initiating performance of the second task. The performance of operations of the second task are timed to initiate upon the buffer construct being communicated to the second task by the first task. The operations that may be triggered by the second task include one of a first-in-time operation of the second task, so that the second task is not initiated until the buffer construct is received, a designated operation (by type or otherwise) of the second task, whether it is the first-in-time operation or not. According to an embodiment, the designated operation may correspond to a memory access operation (such as DMA) to prevent conflict by the two tasks accessing the region of memory represented by the buffer construct. Alternatively, the second task may trigger non-memory access or DMA operations to occur with receipt of the buffer construct, to time performance of operations of the two tasks and potentially avoid other forms of conflict.

As used herein, the terms "programmatic," "programmatically," or variations thereof mean through execution of code, programming, or other logic. A programmatic action may be performed with software, firmware, or hardware, and generally without user-intervention, albeit not necessarily automatically, as the action may be manually triggered.

Some embodiments described herein may be implemented using programmatic elements, often referred to as modules or components, although other names may be used. Such programmatic elements may include a program, a subroutine, a portion of a program, or a software component or a hardware component capable of performing one or more stated tasks or functions. As used herein, a module or component, can exist on a hardware component independently of other modules/components or a module/component can be a shared element or process of other modules/components, programs or machines. A module or component may reside on one machine, such as on a client or on a server, or a module/component may be distributed amongst multiple machines, such as on multiple clients or server machines. Any system described herein may be implemented in whole or in part on a server, or as part of a network service. Alternatively, a system such as described herein may be implemented on a local computer or terminal, in whole or in part. In either case, implementation of the system provided for in this application may use memory, processors and network resources including data ports, and signal lines (optical, electrical, etc.), unless stated otherwise.

Furthermore, some embodiments described herein may be implemented through the use of instructions that are executable by one or more processors. These instructions may be carried on a computer-readable medium. Machines shown in figures below provide examples of processing resources and computer-readable mediums on which instructions for implementing, carrying out, and/or executing the embodiments described herein. In particular, the machines include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on many cell phones and personal digital assistants (PDAs)), and magnetic memory. Computers, terminals, network-enabled devices (e.g., mobile devices such as cell phones) are all examples of machines and devices that utilize processors, memory, and instructions stored on computer-readable mediums.

Programmatic Construct

FIG. 1 illustrates a program construct that decomposes tasks for parallel performance (i.e., concurrently and asynchronously) when the tasks desires access to a common region of memory, according to some embodiments. A program construct 110 is developed by a programmer 102 to include instructions, such as functional-calls and sub-routines, to perform high-level tasks (or provide components). Each task corresponds to a high-level programming function that incorporates one or more low-level operations, such as DMA type memory-access operations. To illustrate, in the field of video processing, a task may correspond to a set of instructions for capturing a video frame, for decoding or encoding the video frame, or for enhancing the video frame. In such an implementation, multiple tasks may be constructed in order to process and analyze a video frame. For example, separate tasks may be used to encode the video frame, and then enhance the video frame. Such tasks may be performed concurrently, but desire access to a common region of memory (e.g., where the video frame is stored).

According to an embodiment, the programmer 102 decomposes the programmatic construct 110 into separate, parallel tasks 120. A template or programming guide 103 may be used to facilitate the programmer 102 in identifying separate and concurrent tasks from the programmatic construct 110. As such, the decomposition of the tasks 120 may be achieved at the developer stage, in-part by way of human design. In one embodiment, a run-time component 112 is integrated into the programmatic construct 110 in order to enable individual tasks 120 to execute by calling and creating a buffer construct 130. As described below, the run-time component 112 includes a library that can respond to calls that request creation of the buffer construct 130. Specific regions of external memory may be designated and assigned to buffer constructs 130 at run-time. According to an embodiment, the buffer construct 130 corresponds to a data structure that includes pointers to a region of the represented memory. As a data structure, the buffer construct 130 can be passed or otherwise communicated amongst tasks 120. According to some embodiments, each task 120 is able to use the buffer construct 130 to perform load operations to transfer data from the region of memory to an external processing resource, or to perform store operations to return processed data to the external region of memory. According to an embodiment, the buffer constructs 130 include data other than pointers, including state information, which provide individual tasks that use the buffer construct the ability control or preclude other tasks from using the buffer construct 130. In one implementation, the run-time component 112 maintains the buffer construct 130 with an assigned task based on the state information of the buffer construct 130. Thus, the state information enables the buffer construct to be owned (i.e., exclusively used) by one task at a time.

As described herein, some embodiments provide that the buffer construct 130 is communicated amongst tasks in order to time when memory access operations amongst concurrently performed tasks are to occur. According to an embodiment, the buffer construct 130 is communicated amongst tasks 120 to trigger when one task can perform memory access operations (e.g., DMA) after completion of memory access operations by a preceding task. In this way, the buffer construct 130 acts as a token that synchronizes each of the concurrent tasks' execution and ensures mutually exclusive access to the common region of memory. Alternatively, the buffer construct 130 may be communicated by a first task to a second task in order to initiate or time the performance of different types of operations of the second task (such as when the second task is to initiate).

At run-time, the program construct 110 executes the tasks 120. Over a given duration of time, multiple tasks 120 may be performed concurrently, so that the start and end times for at least some of the tasks overlap. Depending on the hardware architecture that is in use, however, the tasks 120 are not necessarily simultaneously performed, as each of the tasks may be implemented in accordance with a single-thread (i.e., only one task is performed at any given instance).

Architecture

Figure 2:
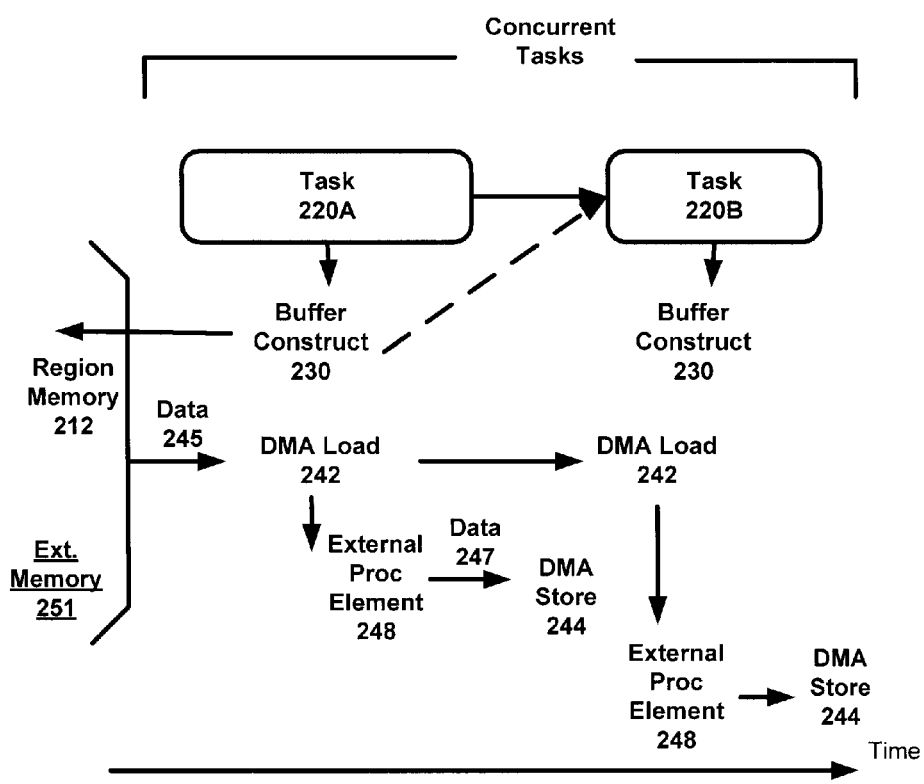
FIG. 2 illustrates a program executing at run-time that uses a buffer construct to create a data pipeline data between one or more processing resources and a region of memory represented by the buffer construct.

FIG. 2 illustrates use of a buffer construct in a program executing at run-time in order to create a data pipeline between a region of memory represented by the buffer construct and one or more processing resources, according to an embodiment. As described with FIG. 1, execution of the program may result in a series of concurrently performed tasks. In a scenario depicted in FIG. 1, the performance of the tasks over a given duration may be serialized, in that one task 220A may be assumed to at least be initiated before another task 220B. This timing is reflected by the time axis.

According to an embodiment, an originating task 220A may be configured to execute and call into the run-time library 112 (FIG. 1) to create the buffer construct 230. As mentioned, the buffer construct 230 is a representation of a region of memory 212. As described with some embodiments, the buffer construct 230 is created to execute in-task operations, then 'passed' to another task 220B that is to utilize the buffer construct 230. The passing of the buffer construct 230 may be achieved by the second task 220B copying the buffer construct 230 (through, for example, a function-call operation into the run-time library 112 of FIG. 1). As described, the passing of the buffer construct 230 serves a purpose of triggering the second task to perform the memory access operations. Additionally, some embodiments provide that the buffer construct 230, by way of its use of state information, includes a mechanism by which in-task operations are synchronized before that buffer construct 230 is released or passed to another task. This ensures that each task 220A, 220B that has use of the buffer construct 230 completes its access operations to the represented region of memory, before that region of memory is accessed by another task. In this way, the passing of the buffer construct 230 serves as a trigger to initiate the use of the buffer construct (and memory access operations) by another task 220B. This allows the tasks 220A, 220B to each access and use the represented region of memory 212 without conflict to another task. In this way, the tasks 220A, 220B may then be performed asynchronously and concurrently, with respective memory access operations of each task being timed to avoid conflicts while accessing the represented region of memory.

With reference to an embodiment of FIG. 2, each task 220A, 220B is implemented to facilitate transport of a relatively large amount of data from the memory source 251 to a relatively small memory component that is local or near an external processing element 248. Optionally, the external processing element 248 is programmable. In FIG. 2, the processing resource corresponds to one or more dedicated low-level processing elements (e.g., Single Instruction Multiple Data ("SIMD") component), on which the corresponding processing element 248 is provided. Accordingly, the in-task operations may include a DMA load operation 242 that moves data 245 from an external memory source 251 that includes the represented region of memory 212 to the processing element 248, and a DMA store operation 244 that moves data 247 as processed by the processing element 248 to the external memory source 251 and the represented region of memory 212. In one embodiment, each of the DMA store operation 244 and the DMA load operation 242 are performed using the buffer construct 230.

According to an embodiment, upon completion of the DMA store operation 244 of the first task 220A, the buffer construct 230 is passed to the second task 220B. The state information of the buffer construct 230 precludes the second task 220B from owning the buffer construct 230 until DMA operations of the first task 220A are complete. This allows the passing of the buffer construct 230 to signify that the second tasks use of the represented region of memory 212 will not conflict with the first task 220A. The passing of the buffer construct 230 serves as a trigger to time the memory access operations that are to be performed under the control of the second task. Likewise, the first task 220A is able to use the buffer construct to synchronize its DMA store/load operations, in that the respective operations are ensured to complete before the represented region of memory 212 is released. The combination of the DMA load and store operations 242, 244 enable each of the tasks 220A, 220B to achieve parallelism in the performance of the load/store operations 242, 244, in that processed data 247 from the processing element 248 is stored at the same time data 245 from the represented region of memory is being loaded. At the same time, each task 220A, 220B is able to implement a pipeline (load/store) with the processing element 248 that is synchronized to not be in conflict with other tasks.

Figure 3:
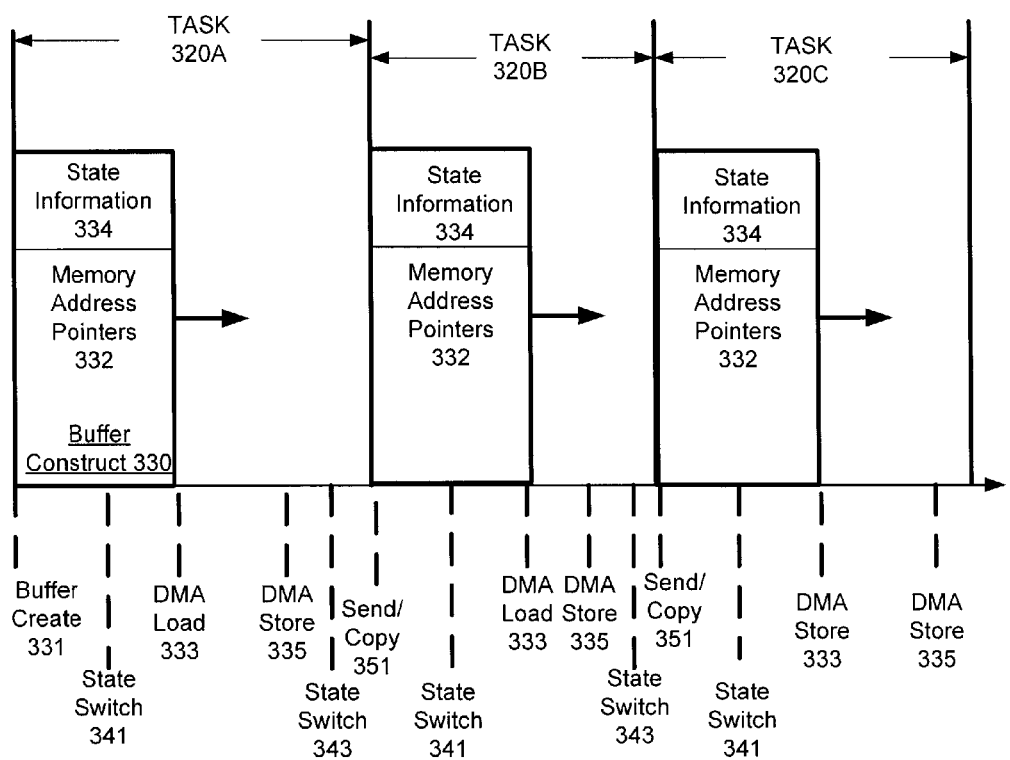
FIG. 3 illustrates a timing sequence depicting the use of a buffer construct in the performance of a set of concurrent and asynchronous tasks.

FIG. 3 illustrates a more detailed timing sequence for using of a buffer construct 330 when performing a set of tasks 320A, 320B, and 320C (collectively, 320), according to some embodiments. In FIG. 3, time is depicted by the horizontal axis. In a timing sequence such as shown, the buffer construct 330 may be created by the first task 320A that is to be performed in time. As mentioned, the buffer construct 330 may correspond to a data structure, with constituent data elements that include pointers 332 to a region of the represented region of memory, and state information 334. In one implementation of an operating environment, multiple tasks 320A, 320B, 320C may use the buffer construct 330 repeatedly over a given duration of the time. According to some embodiments, the tasks 320A, 320B, 320C may be implemented as single-thread tasks that are concurrently, but not simultaneously performed. Thus, in the sequence depicted by FIG. 3, the task 320A may, for example, be followed by the task 320B and then task 320C, followed again by task 320A or task 320B and again by another task. Each task that seeks data from the represented region of memory may utilize the buffer construct 330 to perform in-task operations. As an alternative, the tasks 320A, 3208, 320C may be implemented in an environment (e.g., tasks may be distributed across multiple processors) that enables their performance to be both concurrent and simultaneous.

In the sequence depicted by FIG. 3, the first task 320A performs an operation 331 to create the buffer construct 330 for the first time. In one embodiment, the first task 320A uses the buffer construct 330 to perform a DMA load operation 333 in order to move data from a represented region of memory to memory associated with processing element 248 (see FIG. 2). The first task 320A may then use the buffer construct 330 to perform the DMA store operation 335 where the processed data is stored in the represented region of memory (external to the processing element 248). While the task 320A is performing the DMA operations, it owns the buffer construct 330. It implements its ownership of the buffer construct 330 by assigning the buffer state information 334 to a locked state. State switch operation 341 may place the buffer construct 330 in the locked state at the onset of the load operation 333. When locked, the first task 320A is the only task that uses the buffer construct 330, meaning it is the only task that can access to data in the region of memory represented by the buffer construct 330. When the first task 320A is complete, it performs another state switch operation 343 to assign the buffer construct 330 to the unlocked state (using the state information 334).

In one embodiment, the buffer construct 330 is configured to include information that indicates a current owner of the buffer construct, and whether a DMA load/store operation is currently active to/from the memory represented by the buffer construct 330. The ownership part of the state information 334 ensures that only the owning task is able to access the represented region of memory. The "in use" portion of the state information 334 prevents the owning task from transferring ownership of the buffer construct 330 until its DMA operations are complete. In this way, the state information 334 enables the buffer construct 330 to time or synchronize when memory access operations can be initiated amongst multiple ongoing tasks 320.

Concurrently, the second task 320B may execute instructions that correspond to a call into the run-time component 112 (see FIG. 1) for the buffer construct 330. When the buffer construct 330 has the state information of being closed, it can be copied (operation 351) and used by the second task 320B. As mentioned previously, the first task 320A maintains the state information 334 as locked until it completes its DMA operations. The timing between when the first task 320A completes its DMA operations and switches the buffer construct state to enable use by another task, and when the second task 320B initiates use of the buffer construct 330 may depend on when the second task 320B seeks access to the region of memory represented by the buffer construct 330. The second task 320B may, for example, have a pending call to the run-time library 112 for the buffer construct 330 that is answered when the first task 320A switches the state of the buffer construct 330 (on completion of its DMA operations).

Likewise, the second task 320B switches the buffer construct 330 from the unlocked state to the locked state (switch operation 341) and performs its own set of DMA load/store operations (operations 333, 335). Concurrently with performance of either the first task 320A or the second task 320B, the third task 320C places a call into the run-time component 112 (FIG. 1) for the buffer construct 330 of the represented region of memory. When the second task 320B completes its DMA operations, the second task 320B uses the state information 334 to switch the state of the buffer construct 330 from locked to unlocked (state switch 343). When closed, the third task 320C is able to copy the buffer construct and switch its state from unlocked to locked. The third task 320C can then perform its own set of load/store operations 333, 335.

In this way, FIG. 3 illustrates that the tasks 320A, 320B, 320C are able to own the buffer construct 330 by controlling the state of the buffer construct. Each task 320A, 320B, 320C owns the buffer construct 330 without conflict with another task. This allows the region of memory to be used by just one task at a time, so that no conflict occurs amongst the concurrently performed tasks 320A, 320B, 320C.

While an embodiment such as described with FIG. 3 is described to use the buffer construct 330 as a mechanism to time when memory access operations of concurrent tasks 320 are performed, the buffer construct 330 may also be used to time performance of other operations of the tasks 320 (whether or not they are concurrently performed). In one embodiment, the buffer construct 330 is created as part of the performance of the first task 320A, independent of memory access operations that may (or may not) be performed with the first task 320A. The first task 320A may be structured to communicate the buffer construct 330 at an appropriate time (e.g., such as when no conflict would occur between the two tasks). Thus, the communication of the buffer construct 330 does not have to be tied to completion of memory access operations by the first task 320A. Moreover, the second task 320B may be triggered to perform operations other than memory access operations with receipt of the buffer construct 330. For example, the second task 320B may be initiated only upon receipt of the buffer construct 330. In one implementation, no operations that are under a thread of the second task 320B are performed until the buffer construct 330 is received. As an alternative or addition, non-DMA or non-memory access operations may be triggered to perform upon receipt of the buffer construct 330. Thus, according to some embodiments, even if the second task 320B is initiated to be concurrent with the first task 320A, the buffer construct 330 may be used to initiate operations other than those that seek access to the region of memory represented by the buffer construct 330.

Methodology

Figure 4:
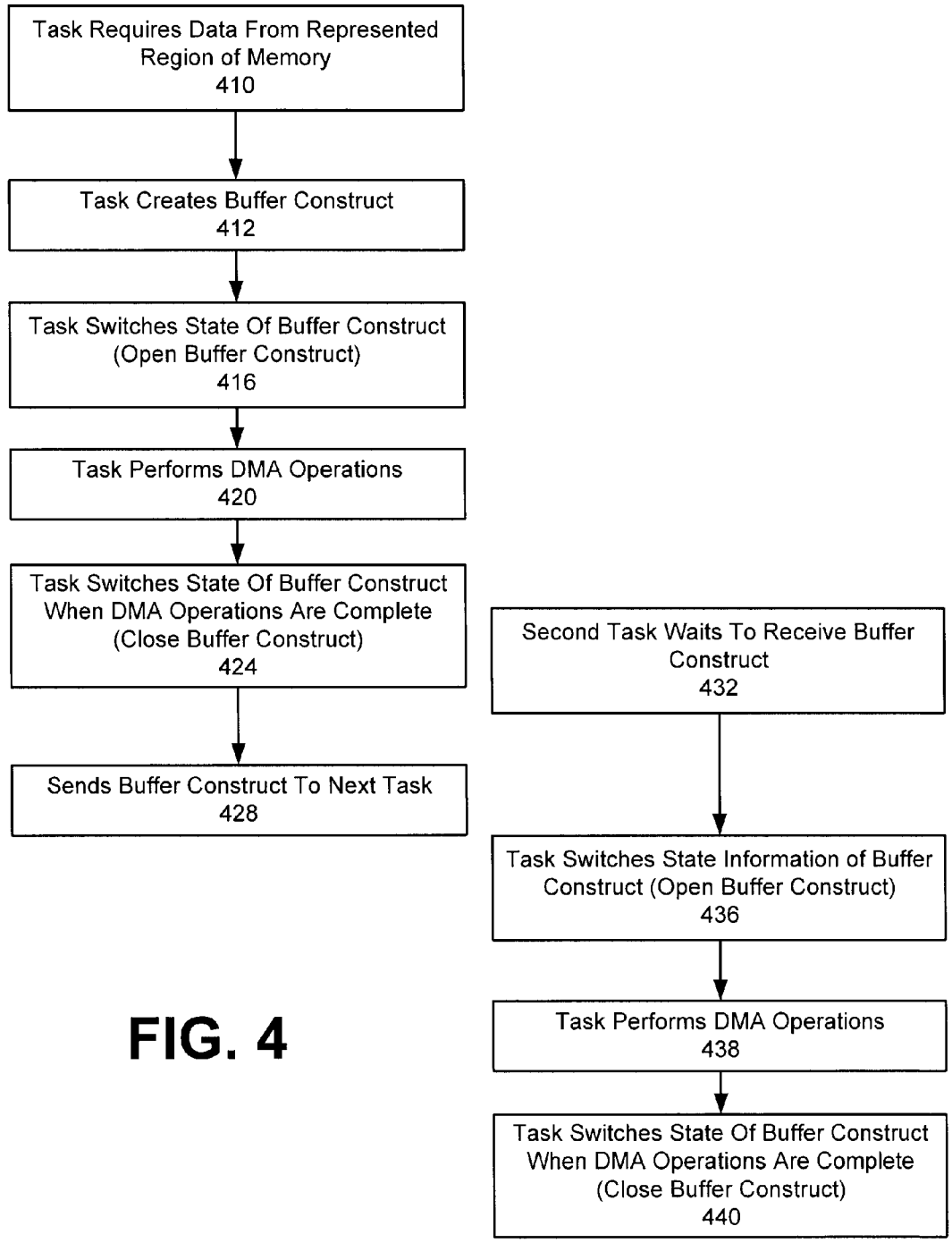
FIG. 4 illustrates a method for using a buffer construct to synchronize performance of tasks having DMA operations that access a common region of external memory.

FIG. 4 illustrates a method for using a buffer construct to synchronize performance of tasks that implement DMA operations to access a common region of external memory, according to some embodiments. An embodiment such as described by FIG. 4 may be implemented using, for example, logic and elements such as described with an embodiment of FIG. 2 or FIG. 3. An embodiment described by FIG. 4 assumes that two tasks are performed concurrently, and each task performs of one or more DMA operations to a common region of memory. A method such as described with FIG. 4 may be implemented on, for example, a system such as described with FIG. 5. As described with an embodiment of FIG. 5, each DMA operation may correspond to a corresponding task attempting to transfer data from an external memory component to a low-level or dedicated processing element, and from the processing element to the external memory component.

In performing two tasks concurrently, step 410 provides that a first one of the tasks (in time) is initiated. When the task is initiated, data stored in a region of memory may be assumed to be accessible. Step 412 provides that the task creates a buffer construct to represent the region of memory. As described with an embodiment of FIG. 4, the buffer construct may include pointers or identifiers to regions of the represented region of memory. The buffer construct may also include state information that indicates whether the buffer construct is owned by the task for use in performing the DMA operations. The represented region of memory may be provided on, for example, a DRAM or similar memory component. The DMA operation may be performed to utilize a processing resource external to the memory component to perform one or more types of operations for the task. For example, as described with an embodiment shown in FIG. 5, the task may be controlled on a central (or task/component) processor, and some tasks may be performed with dedicated processing resources, such as SIMD processing elements. The use of such dedicated processing resources may transfer of data in accordance with performance of DMA operations.

In step 416, once the task initiates use of the buffer construct, the task switches the state of the buffer construct. Prior to initiating use of the buffer construct, the buffer construct may be in a 'closed' state, corresponding to a state where the buffer construct (or its represented region of memory) is not being used in any DMA operation. But with initiation of the DMA operations in the task, the state information of the buffer construct may be used to switch the state of the buffer construct from unlocked to locked. In the locked state, the buffer construct is available to only one task. The use of the buffer construct is locked out to all other tasks. Accordingly, the ability of another task to access the represented region of memory is also precluded.

According to an embodiment, step 420 provides that the initiated task performs one or more DMA operations using the buffer construct. As mentioned, the buffer construct may be used to perform DMA operations to the represented region of memory. The types of DMA operations that can be performed include DMA load and store operations. Alternatively, the buffer construct may be created upon some other event of the first task, such as initiation of the first task. Thus, use of the buffer construct by the first task may be independent of memory access operations to the region of memory.

In step 424, once the DMA operations are complete, the task uses the state information of the buffer construct to switch the state of the buffer construct. The buffer construct is switched from the locked state to the unlocked state. In step 428, the buffer construct is then sent to the next task.

According to an embodiment, the second task may be initiated prior to performance of step 428. Once initiated, the second task may seek access to at least a represented portion of the same region of memory. The buffer construct may be used to trigger when the second task is to perform its memory access operations. In step 432, the second task may wait for the buffer construct to be transmitted from the first task. No DMA operations initiated by the second task may be performed until receipt of the buffer construct from the first task.

In step 436, the second task receives the buffer construct. In one implementation, the second task may copy the buffer construct upon its call to the run-time component 112 being returned (with the state information being switched on the first task). As the second task cannot access the represented region of memory without the buffer construct, receipt of the buffer construct is a synchronization and triggering event, signifying completion of the DMA operations by the first task. The second task may then perform its DMA operations (step 438). As mentioned, the receipt of the buffer construct may serve as a trigger or timing mechanism to initiate the second task in performing its memory access operations.

The receipt of the buffer construct by the second task may actually correspond to the second task copying the buffer construct from the first task at an appropriate instance of time. Once the buffer construct is received, step 440 provides that the state of the buffer construct may be switched again, using the state information associated with the buffer construct. The state information may be switched again from the unlocked state to the locked state, signifying that the buffer construct is owned (or in use) by a single task. Step 432 provides that the second task performs DMA operations, similar to operations performed by the first task. Accordingly, in one implementation, DMA load and save operations may be performed by the second task in order to move data from the memory unit to the external processing resource (e.g., the dedicated processing element).

Once the second task completes its DMA operations, step 440 provides that the state of the buffer construct may be switched again, to allow the buffer construct to be used by another task in order to enable the other task to access data from the represented region of memory. Thus, for example, the state of the buffer construct may be switched again (using the state information) from the locked state to the unlocked state. Another task (such as the first task or a third task) may be performed that also seeks to use the buffer construct in order to access data from the represented region of memory.

As an alternative, the buffer construct may be used to trigger other events of the second task (rather than the memory access operations). In one implementation, the second task is not initiated until the buffer construct is received. As an addition or variation, non-memory access operations of the second task may be initiated or triggered with receipt of the buffer construct from the first task.

Hardware Diagram

Figure 5:
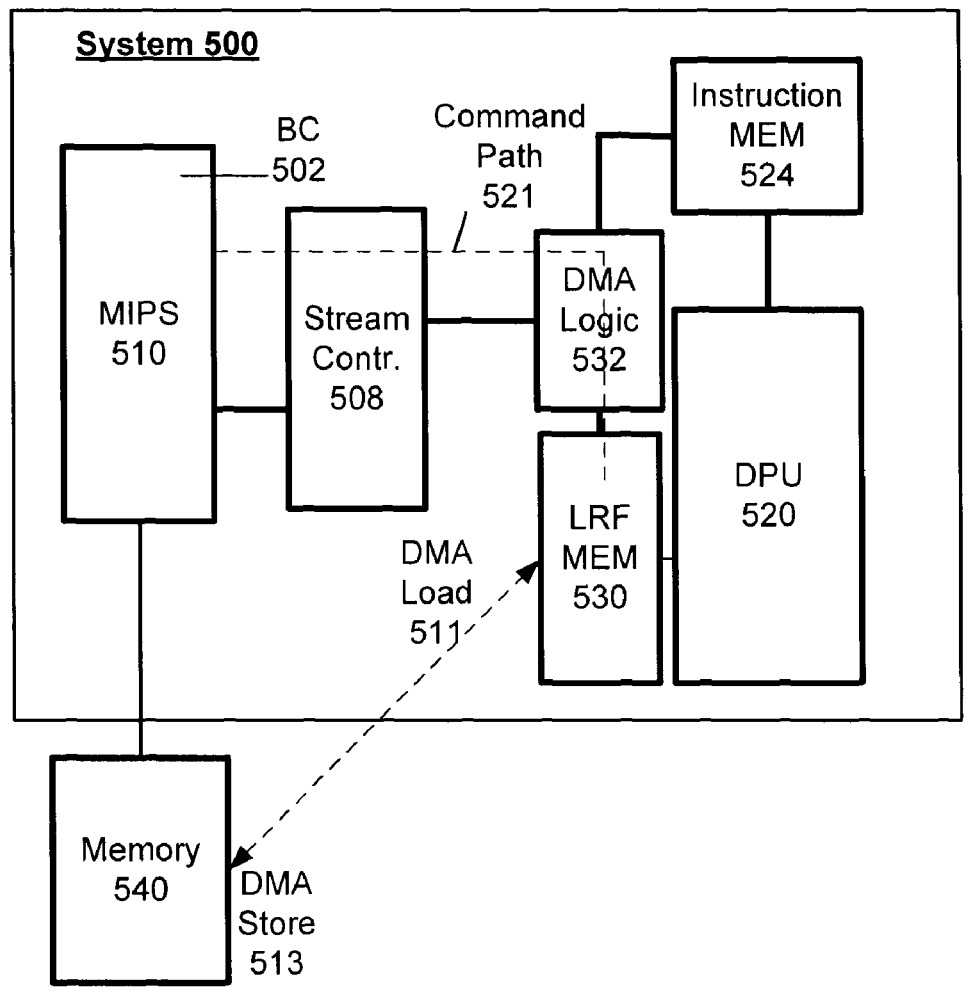
FIG. 5 is a hardware block diagram of a system on which some embodiments may be implemented.

FIG. 5 is a hardware diagram of a system on which some embodiments may be implemented. According to an embodiment, a system 500 includes a high-level processor, depicted in FIG. 5 as a MIPS 510, and a secondary processing resource, depicted in FIG. 5 as a dedicated processing element or unit (DPU) 520, on which one or more low-level processing resources are provided. The DPU 520 may use a relatively small memory component, depicted as a lane register file (LRF) element 530, to hold data for processing. An instruction component 524 may also provided with the DPU 520 to hold instruction data that enables the DPU to configure itself. A logic element 532 may be used to configure the LRF element 530, as a mechanism to manage intake of data to the relatively small memory component. The stream controller 508 may be used to queue instructions initiated from the MIPS 510 (i.e., executed by tasks) for how or when the logic element 532 or DPU 520 execute specific operations. The MIPS 510 may also signal instructions for configuring the DPU 520 to the instruction component 524, where the instructions are held until in use.

The system 500 enables transfer of data between external memory 540 and DPU 520 at the control and direction of tasks executing on the MIPS 510. The external memory 540 may correspond to, for example, dynamic RAM, static RAM, Flash memory (including mass storage drives), hard disk device, or any other memory device that is suitable to support memory access operations such as described. The MIPS 510 may execute tasks which control DMA operations as a mechanism to transfer data from the external memory 540 (which is a large data source) to the LRF element 530 (small data source). To perform DMA operations, the MIPS 510 configures the logic element 532 associated with the DPU 520 to perform the DMA operations. The logic element 532, once configured, may communicate with the external memory 540 and the LRF element 530 in order to perform DMA operations. A command path 521 corresponds to instructions that are generated from tasks executing on the MIPS 510 and passed to the DPU 520 and/or LRF element 530 in order to initiate and perform respective DMA operations. A DMA load operation 511 may move data from the external memory 540 to the LRF element 530 for processing by the DPU 520. A DMA store operation 513 may move processed data outputted from the DPU 520 (or a local processing component thereof) to the external memory 540.

According to some embodiments, such as those described above with respect to FIGS. 1-4, the MIPS 510 may create the data structure 502 that corresponds to the buffer construct. In one embodiment, a task in a series of concurrently performed tasks creates the buffer construct. The tasks that execute on the MIPS 510 are structured to use of the buffer construct 502 in order to access data from the external memory 540 when DPU processing or similar operations are desired. In particular, some embodiments may use the buffer construct 502 when a task executing on the MIPS 510 seeks data from the external memory 540. Accordingly, the buffer construct 502 is used with state information to preclude a second task from using the buffer construct (and thus accessing the represented region of memory) when a first task has control of the buffer construct (i.e., is accessing the represented region of memory). In this way, the buffer construct 502 that resides on the MIPS 510 ensures that the MIPS 510 does not initiate performance of DMA operations that are not synchronized or otherwise in conflict with one another.

Conclusion

It is contemplated for embodiments described herein to extend to individual elements and concepts described herein, independently of other concepts, ideas or system, as well as for embodiments to include combinations of elements recited anywhere in this application. Although illustrative embodiments have been described in detail herein with reference to the accompanying drawings, it is to be understood that the invention is defined by the claims and equivalents, and not limited to those illustrative embodiments. As such, many modifications and variations will be apparent to skilled persons. Accordingly, it is intended that the scope of the invention be defined by the following claims and their equivalents. Furthermore, it is contemplated that a particular feature described either individually or as part of an embodiment can be combined with other individually described features, or as parts of other embodiments, even if the other features and embodiments make no mentioned of the particular feature. Thus, the absence of describing combinations should not preclude the inventor from claiming rights to such combinations.

The invention claimed is:

1. A method for performing multiple data-driven tasks, the method comprising:
   executing, with a computing device, tasks that include a first task and a second task;
   performing an operation of the first task;
   creating a buffer construct that represents a region of memory accessible to the operation of the first task; and
   performing an operation of the second task that is configured to be timed to initiate in response to the buffer construct being communicated to the second task from the first task.

2. A method according to claim 1, in which the first task initiates the step of creating the buffer construct.

3. A method according to claim 1, in which the operation of the first task and the operation of the second task comprise direct memory access operations.

4. A method according to claim 1, in which the tasks comprise concurrent tasks.

5. A method according to claim 1, in which the buffer construct includes state information that enables the buffer construct to be assigned to the first task while the first task has pending direct memory access operations accessing the region of memory.

6. A method according to claim 1, further comprising:
   communicating the buffer construct to the second task in response to completion of the operation of the first task.

7. A method according to claim 1, in which the buffer construct includes state information, and further comprising:
   switching the state information in response to performance of a direct memory operation.

8. A method according to claim 1, in which the buffer construct includes state information, and further comprising:
   switching the state information in response to completion of a direct memory operation.

9. A method according to claim 1, further comprising:
accessing the region of memory with direct memory operations initiated by a task that controls the buffer construct while precluding other direct memory operations from accessing the region of memory.

10. A method according to claim 1, in which the region of memory includes a region of an external memory.

11. A computer-readable medium carrying instructions thereon, the instructions comprising:
instructions to execute, with a computing device, tasks that include a first task and a second task;
instructions to perform an operation of the first task;
instructions to create a buffer construct that represents a region of memory accessible to the operation of the first task; and
instructions to perform of an operation of the second task that is configured to be timed to initiate in response to the buffer construct being communicated to the second task from the first task.

12. A computer-readable medium according to claim 11, in which the operation of the first task includes an operation to create the buffer construct.

13. A computer-readable medium according to claim 11, in which the operation of the first task and the operation of the second task comprise direct memory access operations.

14. A computer-readable medium according to claim 11, in which the tasks comprise concurrent tasks.

15. A computer-readable medium according to claim 11, in which the buffer construct includes state information that enables the buffer construct to be assigned to the first task while the first task has pending direct memory access operations accessing the region of memory.

16. A computer-readable medium according to claim 11, further comprising:
instructions to communicate the buffer construct to the second task in response to completion of the operation of the first task.

17. A computer-readable medium according to claim 11, in which the buffer construct includes state information, and further comprising:
instructions to switch the state information in response to performance of a direct memory operation.

18. A computer-readable medium according to claim 11, in which the buffer construct includes state information, and further comprising:
instructions to switch the state information in response to completion of a direct memory operation.

19. A computer-readable medium according to claim 11, further comprising:
instructions to access the region of memory with direct memory operations initiated by a task that controls the buffer construct while precluding other direct memory operations from accessing the region of memory.

20. A computer-readable medium according to claim 11, in which the region of memory includes a region of an external memory.

* * * * *

UNITED STATES PATENT AND TRADEMARK OFFICE
CERTIFICATE OF CORRECTION

| | |
|---|---|
| PATENT NO. | : 8,219,723 B2 |
| APPLICATION NO. | : 13/275581 |
| DATED | : July 10, 2012 |
| INVENTOR(S) | : Mattson et al. |

It is certified that error appears in the above-identified patent and that said Letters Patent is hereby corrected as shown below:

In Column 7, Line 56, delete "3208," and insert -- 320B, --, therefore.

In Column 9, Line 14, delete "3208" and insert -- 320B --, therefore.

In Column 9, Line 16, delete "3208" and insert -- 320B --, therefore.

In Column 9, Line 19, delete "3208" and insert -- 320B --, therefore.

In Column 9, Line 23, delete "3208" and insert -- 320B --, therefore.

Signed and Sealed this
Fifteenth Day of January, 2013

David J. Kappos
*Director of the United States Patent and Trademark Office*